United States Patent [19]

Lieberman et al.

[11] Patent Number: 5,434,631
[45] Date of Patent: Jul. 18, 1995

[54] COLLAPSIBLE LARGE SCREEN AUDIOVISUAL DISPLAY SYSTEM

[76] Inventors: Phillip L. Lieberman, 6702 E. South Lewis, Tulsa, Okla. 74136; William J. Wiseman, Jr., 1408 S. Denver, Tulsa, Okla. 74119

[21] Appl. No.: 278,513
[22] Filed: Jul. 21, 1994
[51] Int. Cl.6 .............................................. G03B 21/00
[52] U.S. Cl. ..................................... 353/119; 353/74; 355/460; 355/450
[58] Field of Search ...................... 353/119, 74, 75; 359/450, 460; 348/836, 841, 842

[56] References Cited

U.S. PATENT DOCUMENTS

| | | | |
|---|---|---|---|
| 994,276 | 6/1911 | Reilly . | |
| 1,208,462 | 12/1916 | Boernstein | 359/450 |
| 1,460,600 | 7/1923 | Palmer | 359/450 |
| 1,746,607 | 2/1930 | Readeker . | |
| 1,976,049 | 10/1934 | Vansant | 40/30 |
| 2,141,528 | 12/1938 | Garrard et al. . | |
| 2,225,012 | 12/1940 | Kallusch . | |
| 2,441,159 | 5/1948 | Leahman et al. . | |
| 2,617,328 | 11/1952 | Stableford . | |
| 2,666,358 | 1/1954 | Eash | 353/18 |
| 3,134,299 | 5/1964 | Allen . | |
| 3,205,771 | 9/1965 | Harrison et al. . | |
| 3,277,781 | 10/1966 | Moutray . | |

Primary Examiner—William A. Cuchlinski, Jr.
Assistant Examiner—William C. Dowling

[57] ABSTRACT

A collapsible, large screen audiovisual display system is provided. The preferred embodiment of the invention includes a square-shaped, forwardly mounted projection screen bordered by a protective framework. The screen is connected to a rearwardly placed, square-shaped, support frame by four removable horizontal support members, each having first and second ends. The support members are each connected at their first ends to a corner of the screen's protective framework and at their second ends to the corresponding corners of the rear support frame. A flexible drape extends between the screen and rear support frame and is internally supported by a plurality of support ribs. A plurality of spaced loops attached the drape to the four horizontal support members. The invention is equipped with wheels to aid in setup and transportation and includes audio speakers mounted beneath the screen. A video projector and sound system is housed within a projector rack adapted to connect to the rear support frame.

6 Claims, 4 Drawing Sheets

COLLAPSIBLE LARGE SCREEN AUDIOVISUAL DISPLAY SYSTEM

BACKGROUND OF THE INVENTION

1. Technical Field

The invention relates generally to audiovisual display systems, and, more particularly, to an all purpose, collapsible, large screen, rear projection audiovisual display system.

2. Background

Large screen audiovisual display systems are used to project sound and images to sizable audiences. These display systems are commonly used at concerts and other significant gatherings so that those whose view of the stage activities is obstructed or impaired or is otherwise insufficient may see the speaker or performer "close-up" via the display device.

There are many problems, however, with current systems. One obstacle to a broader acceptance of the display systems is price. Prevailing systems range in cost from a low of around $11,000 up to $50,000 and more. For most the expense associated with such a system is prohibitive. Another problem with present systems is portability. At weights up to 1400 pounds, storage is difficult and transportation and setup is expensive, labor intensive, and dangerous. The construction of current devices also causes problems. In an attempt to downsize the devices, complicated mirror reflection systems are used to throw images onto the display screen. Owing to the mirror systems, it is hard to maintain a proper light path alignment from the system projector to the display screen. The ability to project clear, viewable images while surrounded by ambient light also varies greatly from machine to machine. Finally, contemporary systems are not adaptable to changes in sound and image projection means. In other words, current display systems are self-contained and non-interchangeable. Different styles or types of sound or image projectors are not compatible with a single system and cannot be substituted.

SUMMARY OF THE INVENTION

It is thus an object of the present invention to improve the prior art by providing a large screen audiovisual display system which is cost effective to manufacture and is affordable: to the user.

It is a further object of this invention to furnish a large screen audiovisual display system which is of a light weight, collapsible construction, which is easily stored and transported, and which is simple to assemble and disassemble.

Another object of the invention is to incorporate into a large screen audiovisual display system an uncomplicated direct throw image projection capability that preserves a proper light path alignment between the image projector and the display screen.

Still another object of the invention is to provide a large screen audiovisual display system which functions well under even the brightest of ambient light levels.

Yet a further object of the present invention is to supply a large screen audiovisual display system which is capable of utilizing a variety of sound and image projection devices and enables the user to substitute or interchange the devices to suit particular needs.

These and other objects are achieved by the invention disclosed and claimed herein. A large screen audiovisual display system is provided, the system comprising a forwardly placed, rear projection screen adjustably connected to a rearwardly placed, support frame. Both the screen and rear support frame are vertically oriented. The rear support frame is adapted to receive means for projecting images onto the screen and means for sound projection. The screen and rear support frame are connected in such a way that they may collapse each toward the other to facilitate storage and transportation. The space between the screen and rear support frame is enclosed by a flexible drape so that a projection tunnel is formed when the apparatus is in its extended position. A means is also provided for maintaining the drape substantially expanded about the space between the screen and rear support frame when such are extended so that images may be directly thrown from the image projecting means onto the screen.

In its preferred embodiment, the invention includes a square-shaped, forwardly mounted projection screen bordered by a protective flamework. The screen is connected to a rearwardly placed, square-shaped, support frame by four removable horizontal support members, each having first and second ends. The horizontal support members are each adapted to connect at their first ends to a corner of the screen's protective flamework and at their second ends to the corresponding corners of the rear support frame. A flexible drape extends between the screen and rear support frame to form a projection tunnel and is internally supported by a plurality of support ribs spaced throughout the length of the drape. A plurality of spaced loops attach the drape to the four horizontal support members. A multi-level projector rack adapted to connect to the support frame is provided to house means for projecting images onto the screen and means for sound projection. The invention is equipped with wheels to aid in setup and transportation and includes audio speakers mounted beneath the screen.

A better understanding; the invention and the objects thereof will be obtained from the following description, taken in conjunction with the attached drawings.

DETAILED DESCRIPTION OF THE PREFERRED EMBODIMENT

Figure 1:
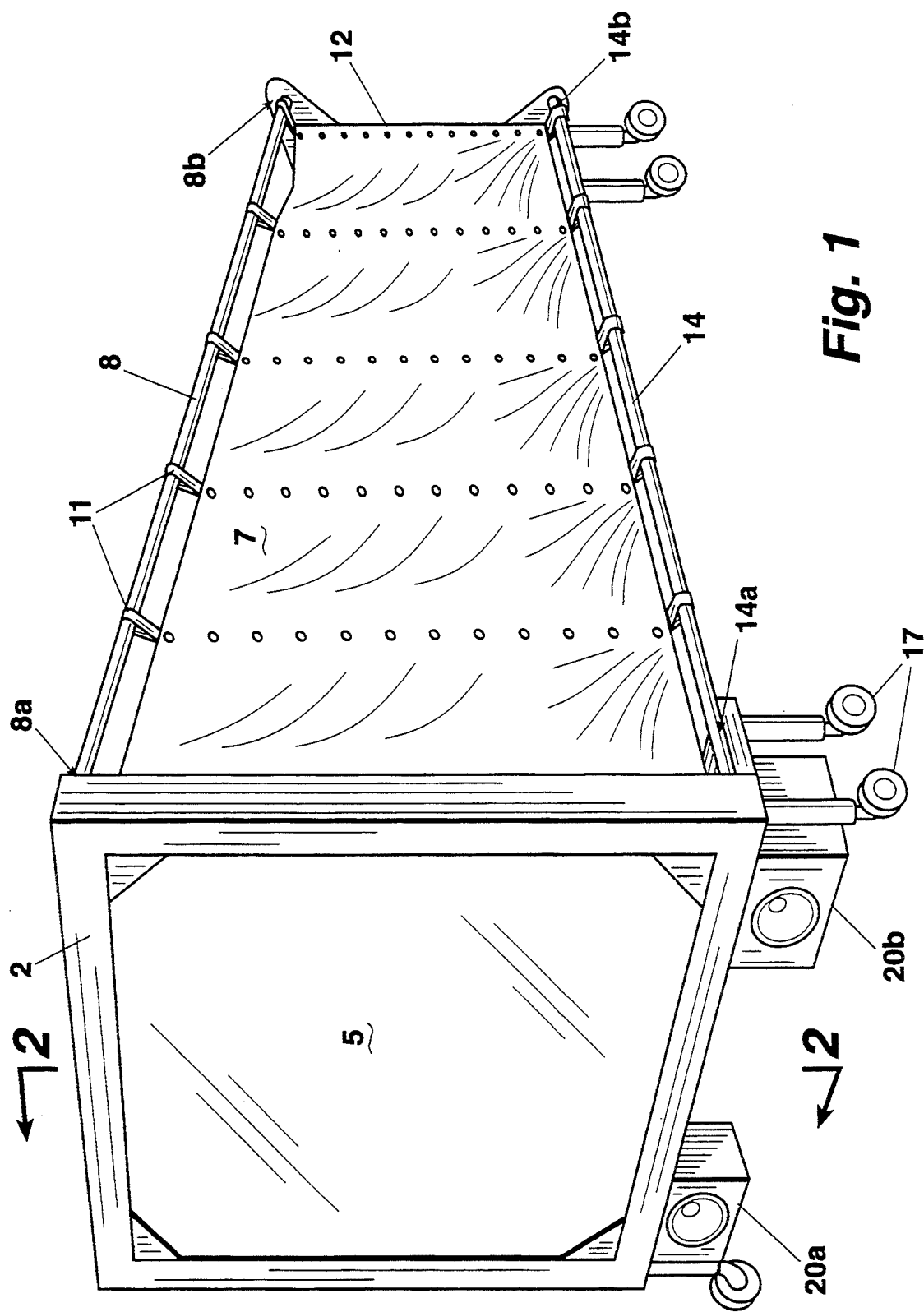
FIG. 1 is a perspective view of the preferred embodiment of the invention showing the invention in its extended position.

Referring to FIG. 1, the element number 2 indicates a square-shaped protective framework surrounding a rear projection screen 5. Screen 5 may be formed from a variety of acceptable rear projection screen materials known in the art. Screen 5 is forwardly placed in relation to rear support frame 12 which is located at the aft end of the invention. Both screen 5 and rear support frame 12 are vertically oriented.

Protective flamework 2 is connected to rear support frame 12 by four removable horizontal support members. Each horizontal support member has a first end adapted to connect to a corner of protective flamework 2 and a second end adapted to connect to the corresponding corner of rear support frame 12. As shown in FIG. 1 and as looking at the invention head on, upper horizontal support member 8 is connectable at its first end 8a to the upper right corner of protective flamework 2 and at its second end 8b to the upper right corner of rear support frame 12. Similarly, lower horizontal support member 14 is connectable at its first end 14a to the lower right hand corner of protective flamework 2 and at its second end 14b to the lower right hand corner of rear support frame 12. The two left side horizontal support members (not shown) are adapted to connect to protective flamework 2 and rear support frame 12 in a like manner. All four horizontal support members are adapted to connect to protective flamework 2 and rear support frame 12 in a releasable fashion such that the horizontal support members may be removed and protective framework 2 and rear support frame 12 may collapse each toward the other to aid in storage and transportation.

In alternate embodiments other means for collapsibly connecting screen 5 and rear support frame 12 may be utilized. One alternate means includes the use of horizontal support members constructed in a telescopic manner so that removal of the horizontal support members is unnecessary. Rather, each horizontal support member collapses upon itself in telescopic fashion when protective framework 2 and rear support frame 12 are pushed together. In this embodiment, the horizontal support members are permanently connected, instead of releasably connected, at each of their respective ends to protective framework 2 and rear support frame 12.

Still with respect to FIG. 1, a flexible drape 7 encloses the space between protective flamework 2 and rear support frame 12 so that a projection tunnel is formed when the apparatus is in its extended position. To function properly, the projection tunnel must be darkened; hence, flexible drape 7 may be made of any suitable non-translucent material. Flexible drape 7 is internally supported by a plurality of support ribs (not shown in FIG. 1) to assist in the formation of the projection tunnel. A plurality of spaced loops 11 attached flexible drape 7 to the four horizontal support members. Flexible drape 7 also covers the back of rear support frame 12 to form the appropriately darkened projection tunnel, but is fabricated with a zipper, velcro, flap or other means whereby access to rear support frame 12 is available.

The invention is equipped with several wheels 17 to aid in setup, take-down and transportation and includes audio speakers 20a and 20b mounted beneath protective flamework 2.

Figure 2:
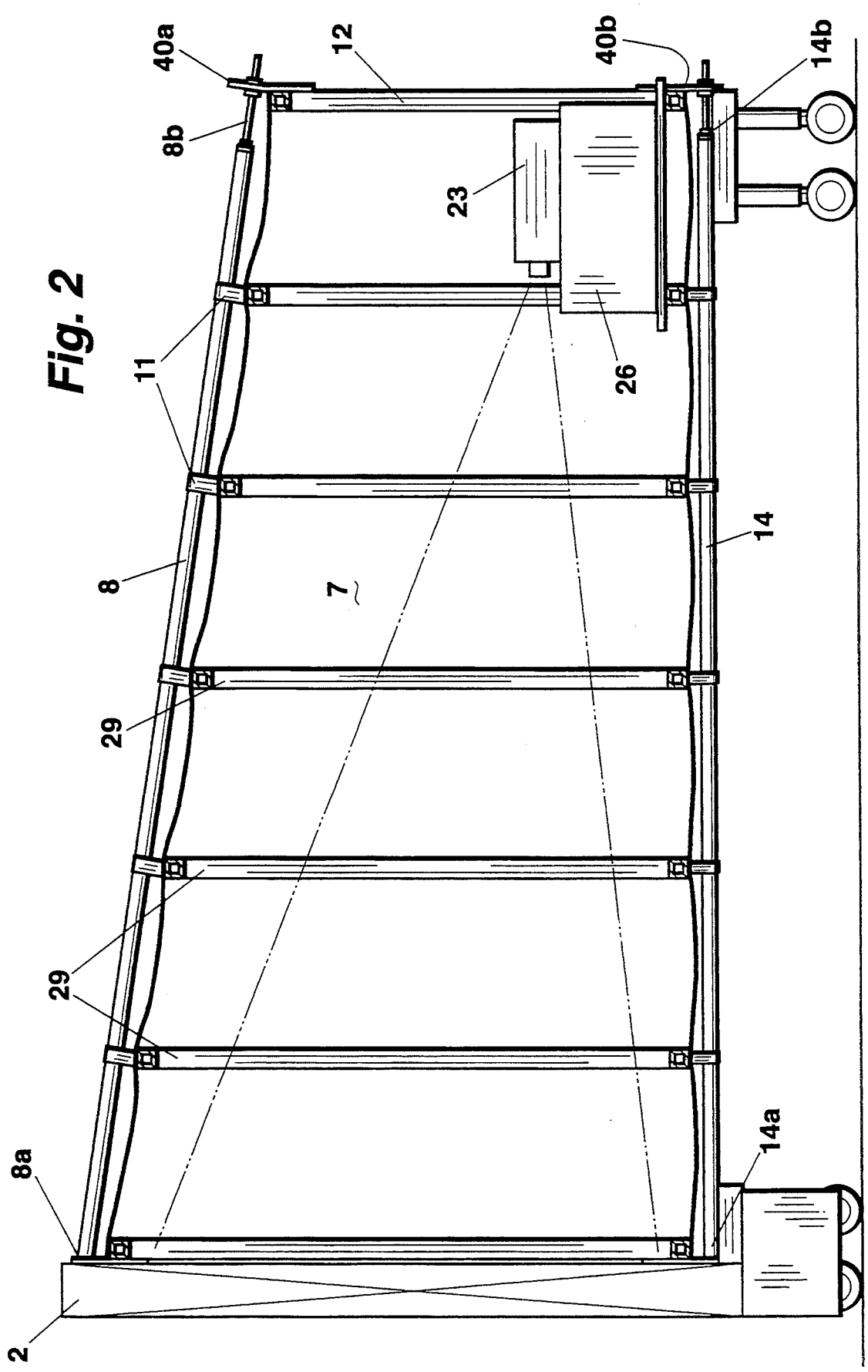
FIG. 2 is a longitudinal cross-section of the preferred embodiment of the invention taken from the left side of the invention.

Referring now to FIG. 2, upper horizontal support member 8 is shown connected on its first end 8a to the upper right corner of protective flamework 2 and on its second end 8b to a bracket 40a which is connected to the upper right corner of rear support frame 12 and is made a part thereof. As seen in this view, horizontal support member 8 is releasably connected to bracket 40a by way of a threaded post and nut assembly. Similarly, lower horizontal support member 14 is releasably connected at its first end 14a to the lower right corner of protective flamework 2 and at its second end 14b to a bracket 40b which is connected to the lower right corner of rear support frame 12 and is made a part thereof. Many other ways of releasably connecting the horizontal support members to protective flamework 2 and rear support frame 12 are known in the art and are acceptable.

Also shown in FIG. 2 are a plurality of support ribs 29 which provide internal support to flexible drape 7 such that flexible drape 7 creates an enclosure around and between screen 5 and rear support frame 12. Support ribs 29 may be made of any light weight material capable of retaining flexible drape 7 in an expanded form. Support ribs 29 may also be constructed in a two-sided (two vertical support ribs, one for each side of the apparatus), three-sided (two vertical support ribs connected to one upper horizontal support rib), or square manner.

Still with respect to FIG. 2, a plurality of spaced loops 11 supportably attach flexible drape 7 and support ribs 29 to the four horizontal support members. Loops 11 are constructed so that the horizontal support members, when removed from protective framework 2 and rear support frame 12, may slide out of loops 11 thereby allowing for the collapse of protective framework 2 and screen 5 toward rear support frame 12. Other devices to supportably attached flexible drape 7 and support ribs 29 to the four horizontal support members, such as hook assemblies, could be used if desired.

Also shown in FIG. 2 is a slide projector 23 and a rear projecting means 26. However, it is to be understood that a wide variety of sound and image projecting devices can be utilized in connection with the present invention. The invention allows for the substitution of projecting devices to increase the adaptability and usability of the machine.

Figure 3:
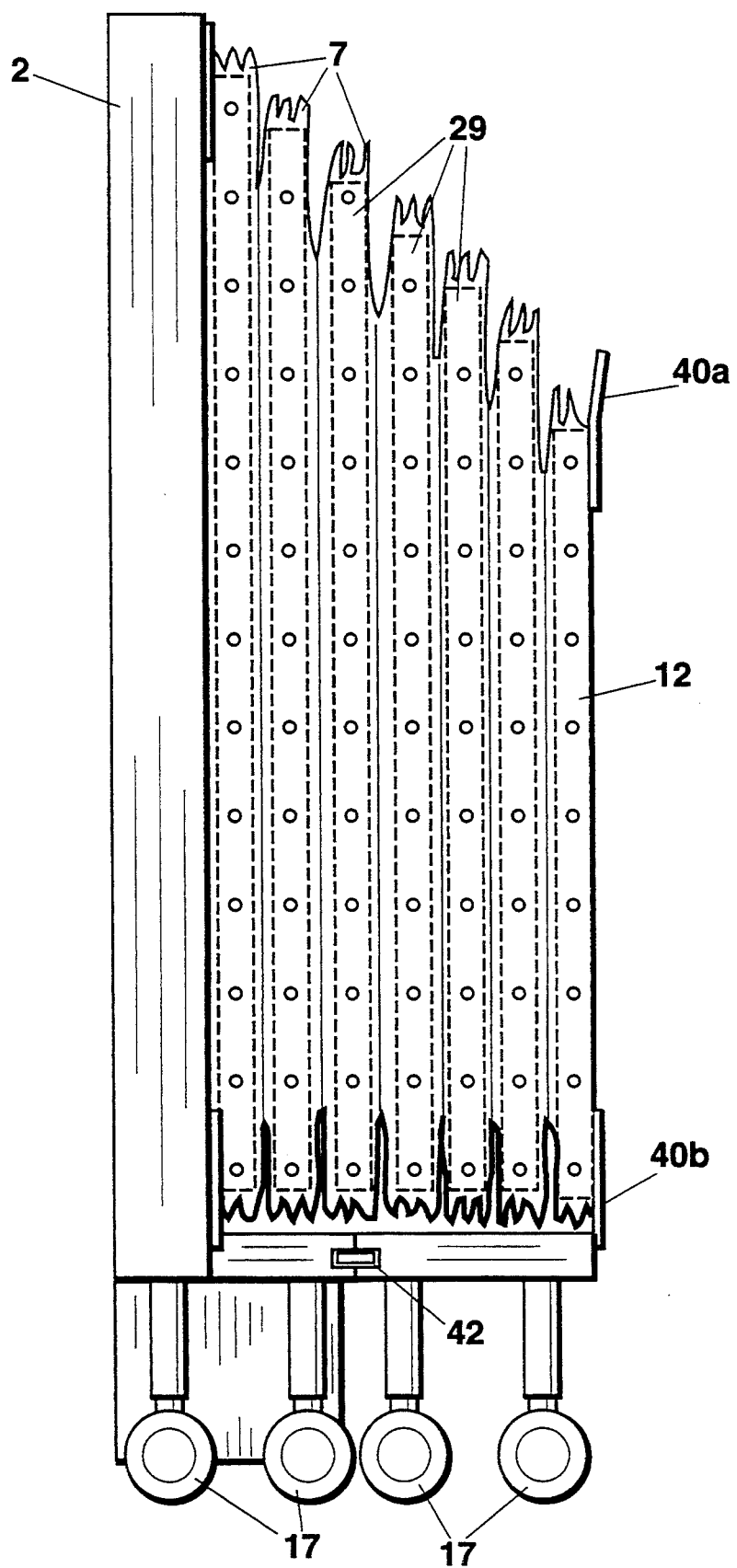
FIG. 3 is a left side view of the preferred embodiment of the invention showing it in its collapsed position.

Turning now to FIG. 3, this view shows the preferred embodiment of the invention in a collapsed position wherein protective flamework 2 is at its closest possible relation to rear support frame 12. Support ribs 29 are also in close relation, but flexible drape 7 still covers the area around and between screen 5 and rear support frame 12. The four horizontal support members have been removed from the apparatus to allow for the collapsing of the device. In its position as shown in FIG. 3, the invention may be stored or transported easily from one location to another as rolled on wheels 17. A latching mechanism 42 may be used to hold the apparatus in its collapsed position.

Figure 4:
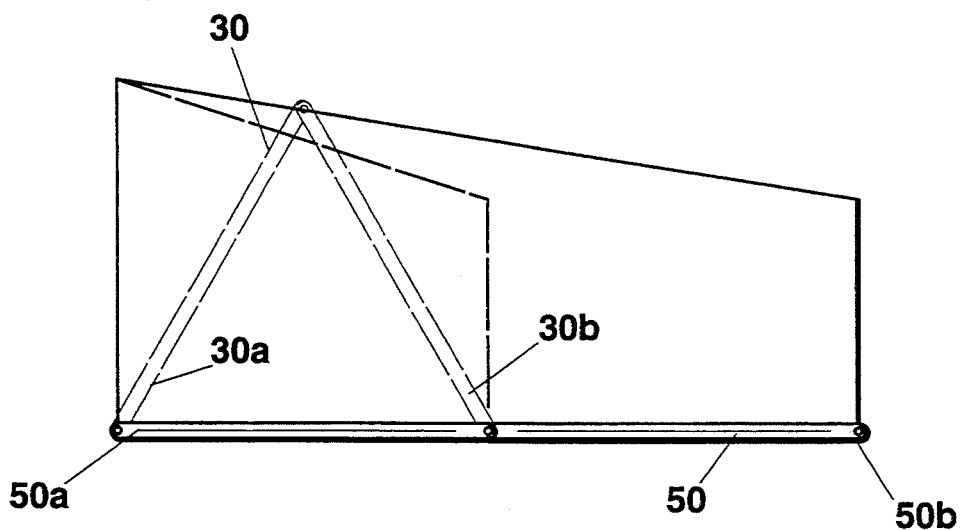
FIG. 4 is a left side view of an alternate form of collapsible bracing for the invention.

FIG. 4 shows an alternate embodiment of the invention wherein the upper horizontal supports are omitted from the apparatus and instead telescoping lower horizontal supports are used in connection with a hinged upper support. Shown is right lower horizontal telescoping support 50 which would be connected at its first end 50a to protective framework 2 and at its second end 50b to rear support frame 12. Also connected near first end 50a of right lower horizontal telescoping support 50 is a first end 30a of a two-piece hinged support 30. The second end 30b of hinged support 30 is connected to right lower horizontal telescoping support 50 at an appropriate distance from first end 50a. The hinged area of hinged support 30 is adapted to internally support flexible drape 7 and support ribs 29 to form the desired projection tunnel when the invention is in its extended position. To achieve its collapsed position, protective flamework 2 is directed toward rear support frame 12 and the lower horizontal telescoping supports shorten thereby bringing the second end 30b of hinged support 30 together with first end 30a.

Figure 5:
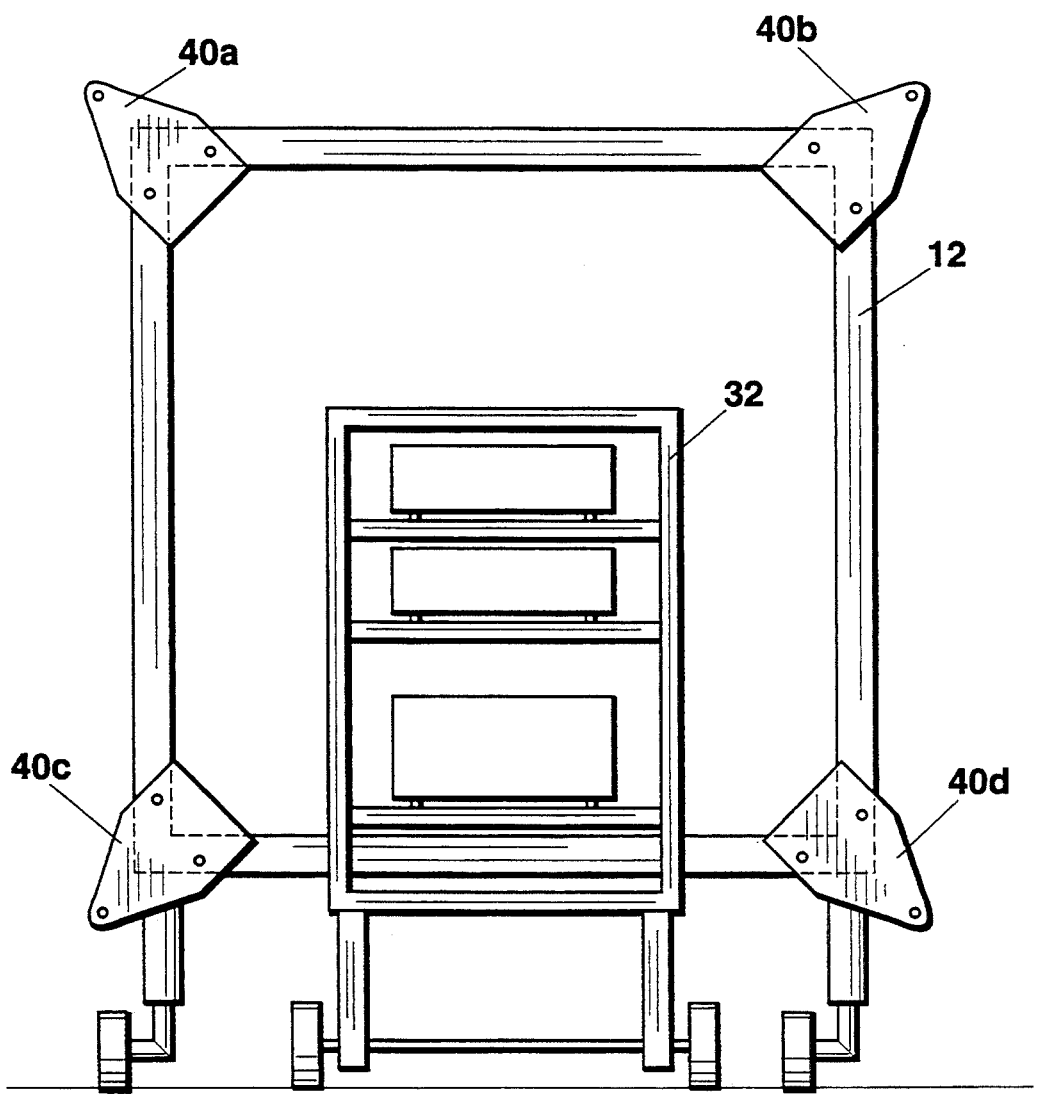
FIG. 5 is a rear view of the preferred embodiment of the invention.

In FIG. 5 rear support frame 12 is clearly shown, including corner brackets 40a–d. Brackets 40a–d are adapted to releasably receive the four horizontal support members. Also shown is a multi-level projector rack 32. Projector rack 32 is adapted to connect to rear support frame 12, but is detachable and is independently rollable to facilitate access to the sound and image projecting means housed therein and to permit the quick and easy substitution of projecting devices. Not shown in FIG. 5 is the rear end of flexible drape 7 which should be understood to cover rear support frame 12, including projector rack 32, when the invention is in use.

To utilize the present invention the user simply rolls the stored, collapsed apparatus to an appropriate location, unlatches latching mechanism 42, pulls protective flamework 2 away from rear support frame 12, inserts the four horizontal support members, and engages the sound and image projecting means. After use, the reverse procedure is used and the device is easily transported and stored until it is next required.

Considering the components used in the construction of the invention, its manufacture is cost effective, translating into affordability for the user. Also owing to the simplicity of construction and the light weight of the system components, the device is easily stored, transported, assembled, and disassembled. Further still, because the invention possesses an uncomplicated direct throw image projection capability, a proper video light path alignment is easily maintained despite repeated setup and take-down. Additionally, the invention functions well even under the brightest of ambient light conditions due to the non-translucent character of flexible drape 7. Finally, the user is benefitted tremendously by the invention through the ability to substitute or interchange sound or image projection components to suit particular needs.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A large screen audiovisual display system, comprising:
    a. a forwardly placed, vertically oriented, rear projection screen;
    b. a rearwardly placed, vertically oriented, support frame adapted to receive means to project images onto the screen and means for sound projection;
    c. means for collapsibly connecting the screen and the rear support frame;
    d. a flexible drape for creating an enclosure around and between the screen and the rear support frame; and
    e. means for maintaining the drape substantially expanded about the space between the screen and the rear support frame when such are extended apart so that the images may be projected upon the screen; and
    f. a plurality of wheels connected to the screen and the rear support frame for facilitating movement of the apparatus.

2. A large screen audiovisual display system, comprising:
    a. a forwardly placed, vertically oriented, rear projection screen;
    b. a rearwardly placed, vertically oriented, support frame adapted to receive means to project images onto the screen and means for sound projection;
    c. a plurality of telescoping horizontal support members each having a first end connected to the screen and a second end connected to the rear support frame for collapsibly connecting the screen and the rear support frame;
    d. a flexible drape for creating an enclosure around and between the screen and the rear support frame; and
    e. means for maintaining the drape substantially expanded about the space between the screen and the rear support frame when such are extended apart so that the images may be projected upon the screen.

3. A large screen audiovisual display system, comprising:
    a. a forwardly placed, vertically oriented, rear projection screen;
    b. a rearwardly placed, vertically oriented, support frame adapted to receive means to project images onto the screen and means for sound projection;
    c. means for collapsibly connecting the screen and the rear support frame;
    d. a flexible drape for creating an enclosure around and between the screen and the rear support frame; and
    e. a plurality of support ribs spaced throughout the length of the drape for maintaining the drape substantially expanded about the space between the screen and the rear support frame when such are extended apart so that the images may be projected upon the screen.

4. A large screen audiovisual display system, comprising:
    a. a forwardly placed, vertically oriented, rear projection screen bordered by a square-shaped protective flamework;
    b. a rearwardly placed, vertically oriented, square-shaped support frame, the rear support frame being of a smaller dimension than the protective framework;
    c. four removable horizontal support members, each having a first end adapted to connect to a corner of the protective flamework and a second end adapted to connect to the corresponding corner of the rear support frame;
    d. a flexible drape for creating an enclosure around and between the screen and the rear support frame, the drape being internally supported by a plurality of support ribs spaced throughout the length of the drape;
    e. a plurality of loops for supportably attaching the drape to the horizontal support members; and
    f. a multi-level projector rack adapted to connect to the rear support frame, the projector rack adapted to house means for projecting images onto the screen and means for sound projection.

5. The apparatus according to claim 4, further comprising a plurality of wheels connected to the screen and the rear support frame for facilitating movement of the apparatus.

6. The apparatus according to claim 4, further comprising one or more audio speakers mounted beneath the screen.

* * * * *